United States Patent [19]
Takahashi

[11] Patent Number: 5,115,257
[45] Date of Patent: May 19, 1992

[54] MULTI-TONE LASER BEAM WRITING APPARATUS FOR IMAGE FORMING EQUIPMENT

[75] Inventor: Hiroshi Takahashi, Kawasaki, Japan

[73] Assignee: Ricoh Company, Ltd., Tokyo, Japan

[21] Appl. No.: 528,493

[22] Filed: May 25, 1990

[30] Foreign Application Priority Data

May 30, 1989 [JP] Japan .................................. 1-134675

[51] Int. Cl.⁵ ............................................. H04N 1/21
[52] U.S. Cl. .................................... 346/108; 358/296
[58] Field of Search ................... 346/108, 107 R, 160; 388/296, 300, 302, 298

[56] References Cited

U.S. PATENT DOCUMENTS 4,799,069 1/1989 Sasaki et al. .................... 346/108

Primary Examiner—Mark J. Reinhart
Attorney, Agent, or Firm—Oblon, Spivak, McClelland, Maier & Neustadt

[57] ABSTRACT

A multi-tone laser beam writing apparatus renders a multi-tone image accurately by a single dot and with a simple construction. The apparatus prevents dot densities from concentrating so as to render halftone evenly.

5 Claims, 14 Drawing Sheets

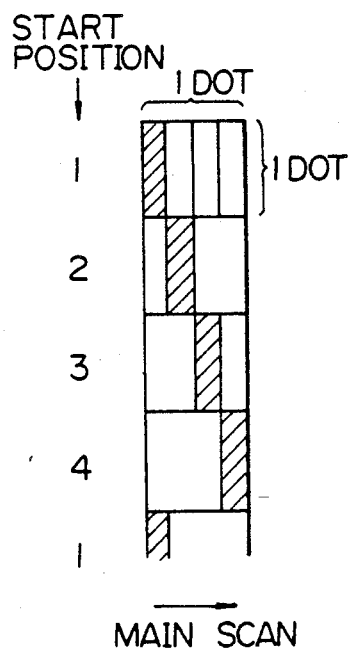
Fig.15A
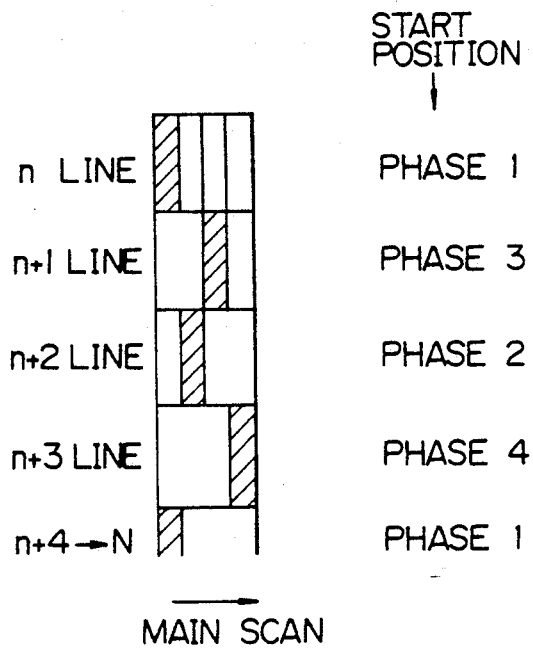
Fig.15B
Fig.15C
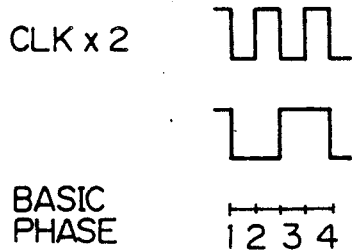

MULTI-TONE LASER BEAM WRITING APPARATUS FOR IMAGE FORMING EQUIPMENT

BACKGROUND OF THE INVENTION

1. Field of the Invention

The present invention relates to image forming equipment and, more particularly, to a multi-tone laser beam writing apparatus capable of rendering multiple tones by a single dot.

2. Discussion of the Background

Some modern image forming equipment such as digital copiers, laser beam printers and facsimile machines have a capability of rendering an image in multiple tones. For example, a digital copier with such a capability reproduces an image in multiple tones by using dither and renders, among others, a photographic image smoothly. Increasing the dither would enhance the reproduction of tones, but it would lower the resolution. While this dilemmatic situation may be eliminated by increasing the writing density, such an approach increases the cost and impedes high-speed processing. It follows that, whether the document be a text document or a photographic document, both the high resolution and the high reproducibility of tones are achievable if data can be written in multiple tones by a single dot.

Generally, multi-tone laser beam writing is implemented by either one of two different systems, i.e., a pulse width modulation (PWM) system and an analog modulation system. The PWM system is disclosed in, for example, Japanese Patent Laid-Open Publication (Kokai) No. 125338/1988. PWM systems heretofore proposed have a drawback in that the output PWM signal is not accurate because the image signal contains noise and because it is not easy to form a pattern signal and to synchronize the image signal and pattern signal to each other. The analog modulation system is taught in, for example, Japanese Patent Laid-Open Publication No. 184773/1988. A problem with the conventional analog modulation system is that the number of tones cannot be increased without increasing the component parts and elements of a voltage applying device and without complicating the control. In this connection, to provide $2^n$ tones, n constant current sources are needed. Even though light issuing from a semiconductor laser may be controlled in quantity on the basis of a great number of tones, it is likely that an image cannot be printed out in densities matching the quantities of output light of a semiconductor laser due to the aging of a photoconductive drum and toner included in the laser beam printer. The analog modulation system is disadvantageous for the above reasons, although it is capable of providing an infinite number of tones. While the PWM signal produced by the PWM system may be subjected to analog modulation, the accuracy of the PWM signal is not high enough to achieve desirable tone reproducibility.

SUMMARY OF THE INVENTION

It is therefore an object of the present invention to provide a multi-tone laser beam writing apparatus capable of rendering an image accurately in multiple tones by a single dot with a simple construction.

It is another object of the present invention to provide a multi-tone laser beam writing apparatus capable of rendering halftones evenly by scattering the densities of dots.

It is another object of the present invention to provide a generally improved multi-tone laser beam writing apparatus for image forming equipment.

A multi-tone laser beam writing apparatus of the present invention comprises a pixel clock generating circuit for generating pixel clocks by dividing a plurality of reference clocks, and a modulating circuit for modulating a quantity of a laser beam in response to the pixel clocks generated by the pixel clock generating curcuit.

BRIEF DESCRIPTION OF THE DRAWINGS

The above and other objects, features and advantages of the present invention will become more apparent from the following detailed description taken with the accompanying drawings in which:

FIGS. 8, 8A, and 8B are a block diagram showing a modulation contro circuit associated with a semiconductor laser;

FIGS. 15A to 15C are views representative of a modified approach associated with FIGS. 14A to 14F.

DESCRIPTION OF THE PREFERRED EMBODIMENT

To better understand the present invention, some prior art multi-tone laser beam writing systems will be discussed specifically.

Figure 1:
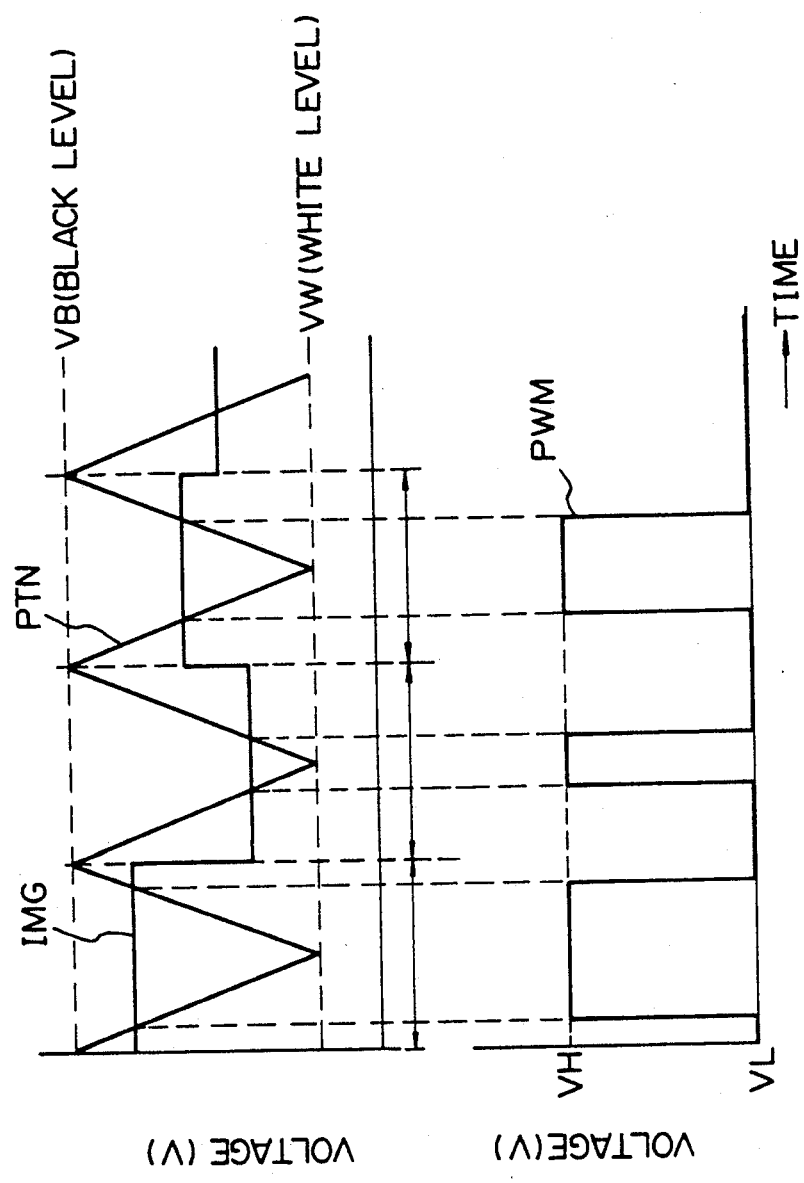
FIG. 1 is a chart representative of a PWM system which is one of conventional multi-tone laser beam writing systems.

A PWM system belonging to a family of multi-tone laser beam writing systems uses a digital-to-analog (DA) converter. The DA converter generates an image signal IMG, as shown in FIG. 1. On the other hand, a PWM device generates a pattern signal PTN as also shown in FIG. 1. The image signal IMG and pattern signal PTN are synchronized in the manner indicated in FIG. 1. A level comparator built in the PWM device compares the levels of the signals IMG and PTN and produces a pulse signal PWM representative of the result of the comparison, as shown in FIG. 1.

Figure 2:
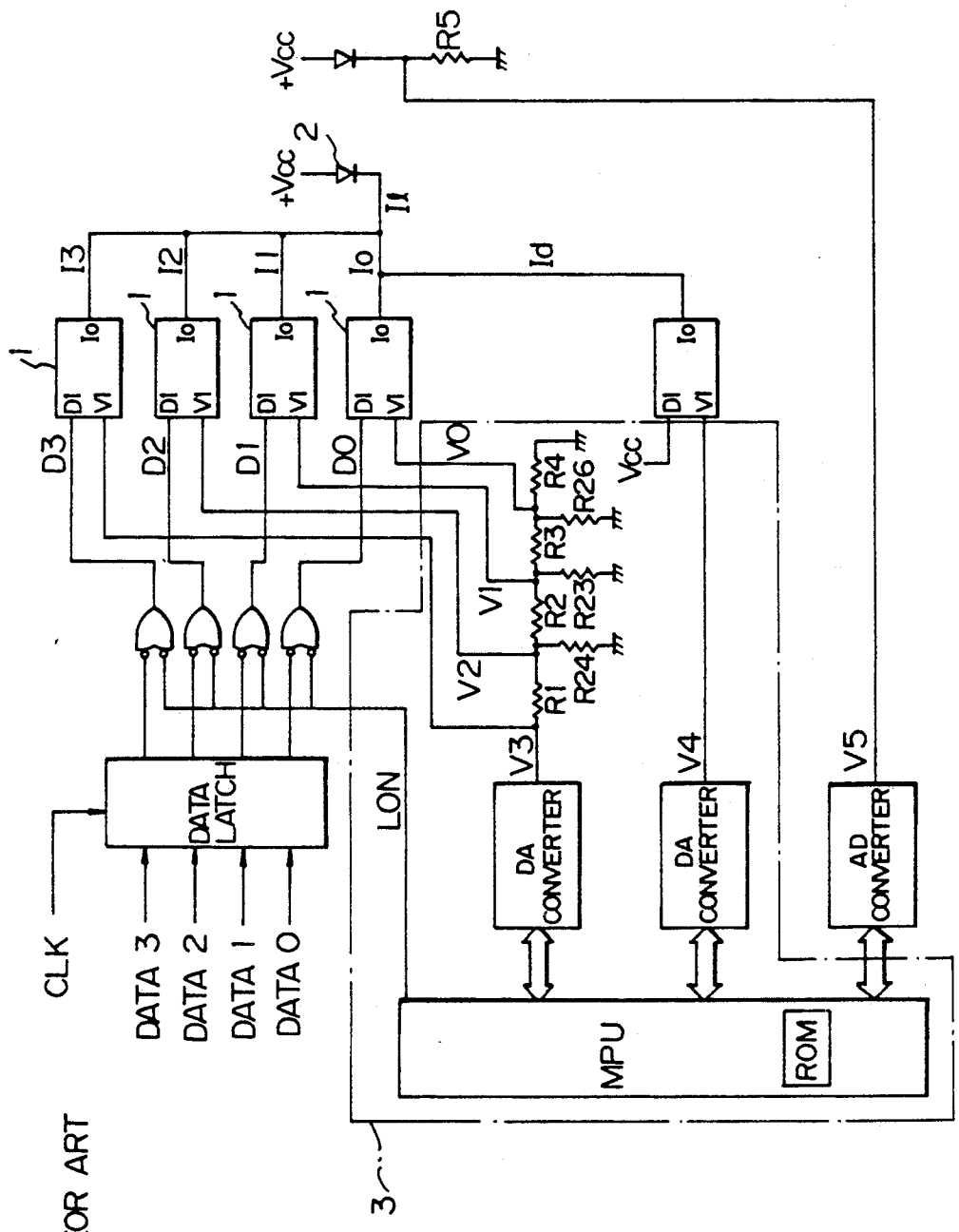
FIG. 2 is a block diagram schematically showing an analog modulation system which is another conventional multi-tone laser beam writing system.

FIG. 2 shows an analog modulation system which is another conventional multi-tone laser beam writing system. As shown, the system has a plurality of, four in the specific construction of FIG. 2, voltage-to-current converters 1 which respectively convert input voltages V0 to V3 into currents I0 to I3 in response to input two-level data D0 to D3. A photodetector 2 is interconnected to the output terminals of the voltage-to-current converters 1 and is responsive to the amount of light issuing from a semiconductor laser. A voltage applying circuit 3 applies to the voltage-to-current converters 1 the voltages V0 to V3 which are set in matching relation to the amount of light detected by the photodetector 2. In this manner, the analog modulation system transforms a plurality of voltages V0 to V3 produced by voltage division into currents I0 to I3 and, based on the sum I1 of the currents I0 to I3, executes analog modulation.

The conventional writing systems constructed as described above have some problems left unsolved, as stated previously.

Figure 3:
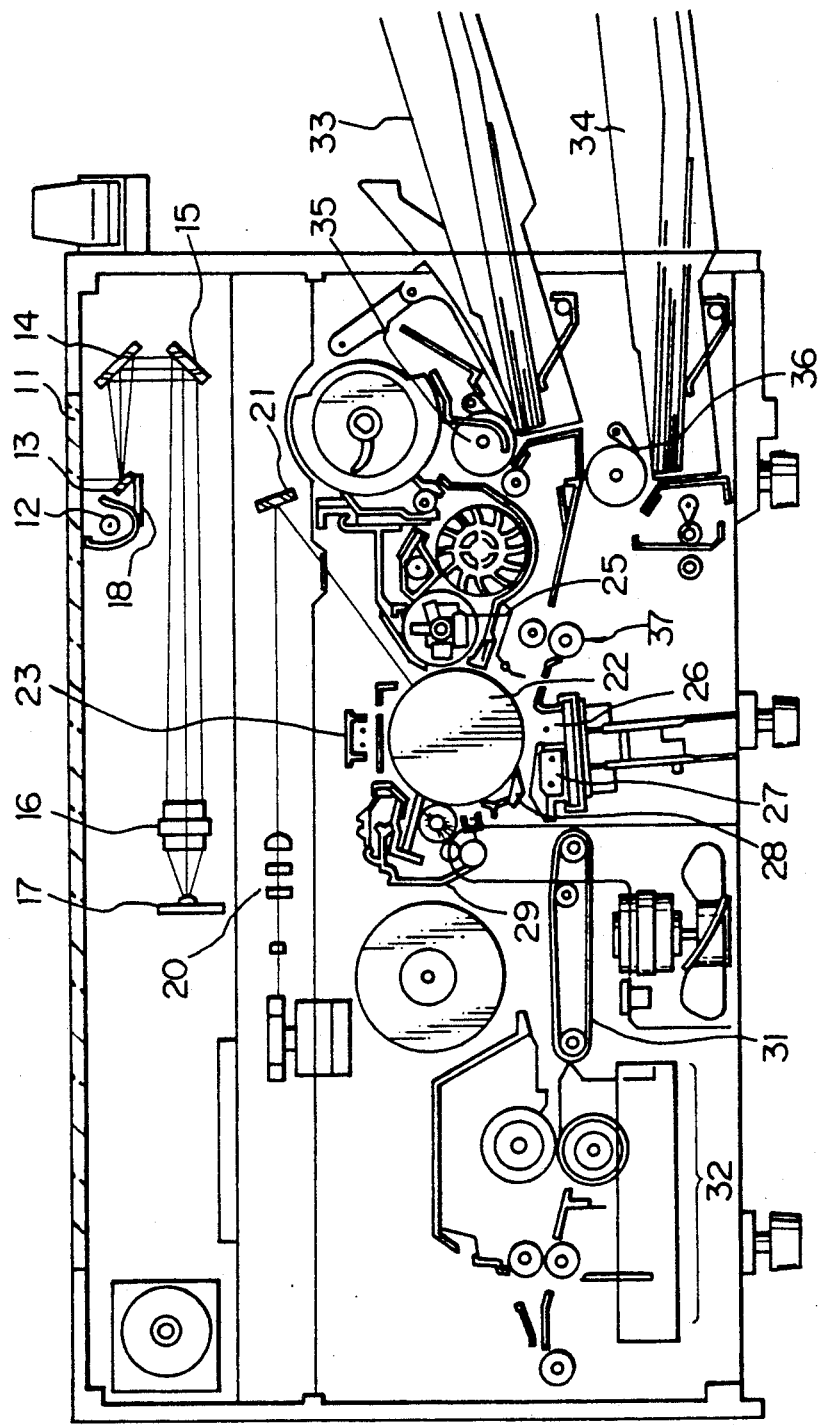
FIG. 3 is a section showing a laser beam printer to which an apparatus embodying the present invention is applied.

Referring to FIG. 3, image forming equipment to which a multi-tone laser beam writing apparatus embodying the present invention is applied is shown and implemented as a laser printer, by way of example. An image reader associated with the laser printer will be described first. In FIG. 3, a document, not shown, is loaded on a glass platen 11 and illuminated by a light source 12. A reflection from the document is steered by mirrors 13, 14 and 15 and then focused by a lens 16 onto the light-sensitive surface of a CCD (Charge Coupled Device) image sensor 17. The light source 12, mirrors 13, 14 and 15 and lens 16 constitute optics. The light source 12 and mirror 13 are mounted on a carriage 18 which is movable below and in parallel to the glass platen 11. Main scanning is implemented by the scanning of the CCD image sensor 17. Specifically, the CCD image sensor 17 reads the document one-dimensionally, while the optics are moved along the glass platen 11 to effect subscanning. In the illustrative embodiment, the reading density is selected to be 16 pixels per millimeter in both of the main and subscanning directions, so that paper sheets of up to format A3 (297 millimeters×420 millimeters) may be read.

The laser printer also has a laser beam writing device, an image reproducing device, a paper feeding device, etc.

Figure 4A:
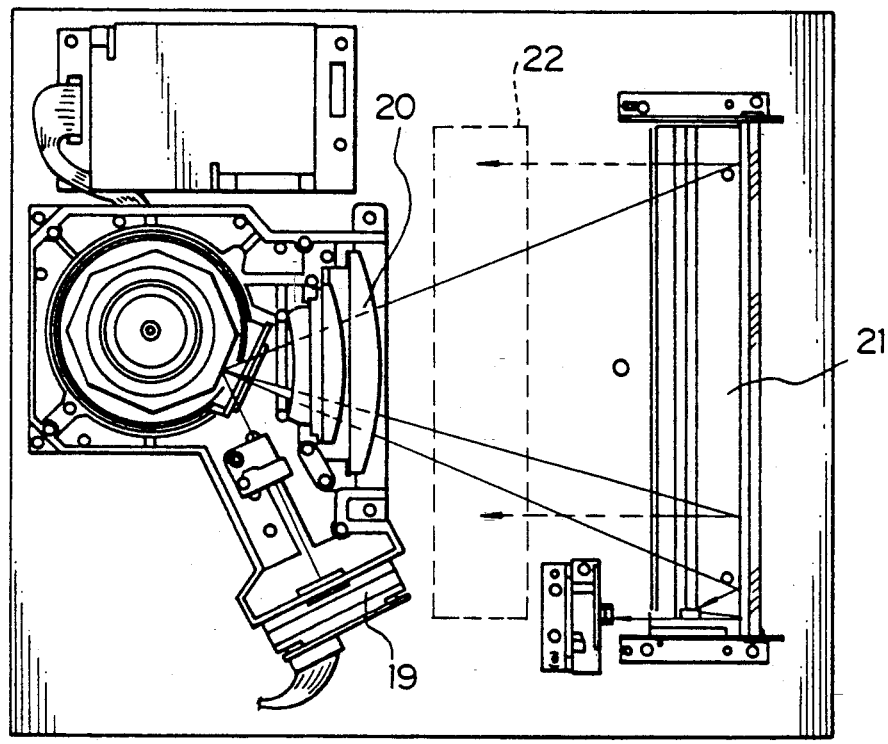
FIGS. 4A and 4B are respectively a plan view and a side elevation of the laser beam writing apparatus installed in the laser beam printer of FIG. 3.
Figure 4B:
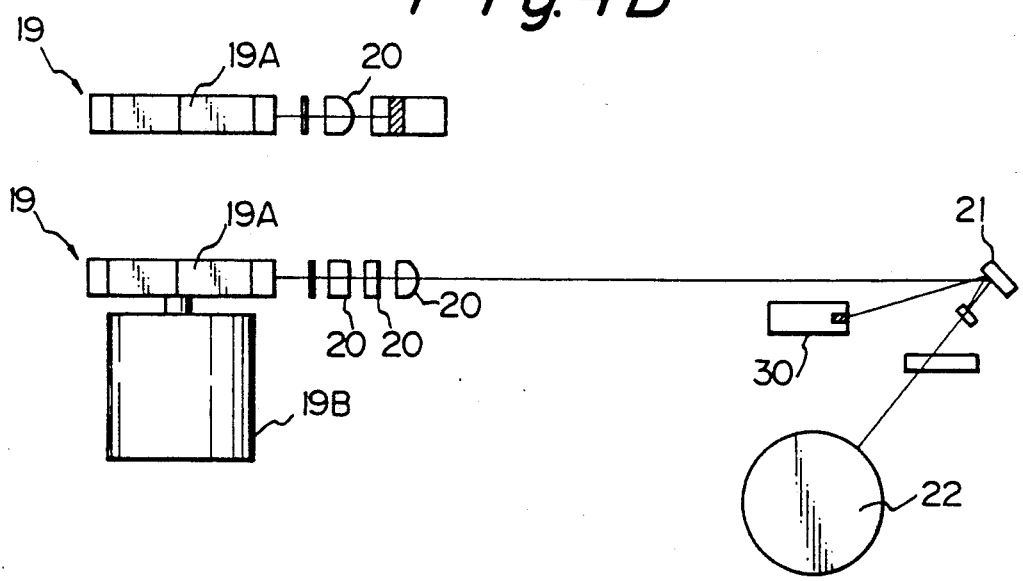

As shown in FIG. 3 and in FIGS. 4a and 4B in more detail, the laser beam writing device has a laser beam output unit 19, a lens 20, and a mirror 21. As shown in FIG. 4B, the laser beam output unit 19 has thereinside a laser diode, and a polygonal mirror 19A which is rotated at high speed by a motor 19B. A laser beam issuing from the laser beam writing device irradiates a photoconductive drum 22 which is included in the image reproducing device. As shown in FIG. 3, a main charger 23, a developing unit 25, a transfer charger 26, a separation charger 27, a papar separator in the form of a pawl 28, and a cleaning unit 29 are arranged around the drum 22. A beam sensor 30 is located in a position adjacent to one end of the drum 22 and where the laser beam reaches, in order to generate a main scanning synchronizing signal MSYNC.

How an image is reproduced will be outlined. The main charger 23 uniformly charges the surface of the drum 22 to a high potential. When the laser beam is incident or the charged surface of the drum 22, the potential is lowered in the irradiated portion. Since the laser beam is modulated in matching relation to the black/white levels of pixels to be recorded, the laser beam electrostatically forms a latent image in the form of a potential distribution on the drum 22. As the area of the drum 22 where the latent image has been formed reaches the developing unit 25, the unit 25 deposits a toner or the drum 22 on the basis of the potentials of the latter and thereby produces a toner image. A paper sheet is fed at a predetermined timing to the portion of the drum 22 carrying the toner image thereon. The transfer charger 26 transfers the toner image to the paper sheet, and then the separation charger 27 separates the paper sheet from the drum 22. The paper sheet separated from the drum 22 is transported by a belt 31 to a fixing unit 32 having a heater thereinside. After the toner image on the paper sheet has been fixed by the fixing unit 32, the paper sheet is driven out to a tray, not shown.

In the illustrative embodiment, the paper feeding device has two paper cassettes 33 and 34 each being loaded with paper sheets of particular size. The paper sheets stacked on the paper cassettes 33 and 34 are fed out by feed rollers 35 and 36, respectively. The paper sheet fed from the paper cassette 33 or 34 is once brought to a stop by a register roller pair 37 and, at a predetermined timing synchronous to the progress of the recording process, driven by the register roller pair 37 to the drum 22. The two different paper feeding lines each has a size sensor for sensing the size of paper sheets, although not shown in the figure.

Figure 5:
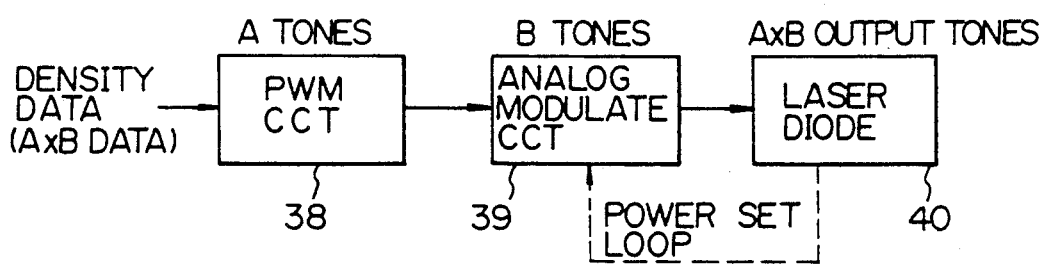
FIG. 5 is a block diagram schematically showing an embodiment of the multi-tone laser beam writing apparatus in accordance with the present invention.

Referring to FIG. 5, a multi-tone laser beam writing apparatus embodying the present invention is shown and comprises a PWM circuit 38, an analog modulating circuit 39, and a laser diode 40. Assume that density data (the number of which is A×B) is applied to the PWN circuit 38 as 4-bit data. The PWM circuit 38 executes pulse width modulation with respect to A tones on the basis of the upper bits of the input data, e.g. an upper one bit. The output of the PWM circuit 38 is fed to the analog modulating circuit 39 which then executes analog modulation with respect to B tones on the basis of lower bits of the the input, e.g. the lower three bits. Hence, the output signal of the analog modulating circuit 39 has A×B tones and is applied to the laser diode 40.

Hereinafter will be described a system for controlling the analog modulation.

Figure 6:
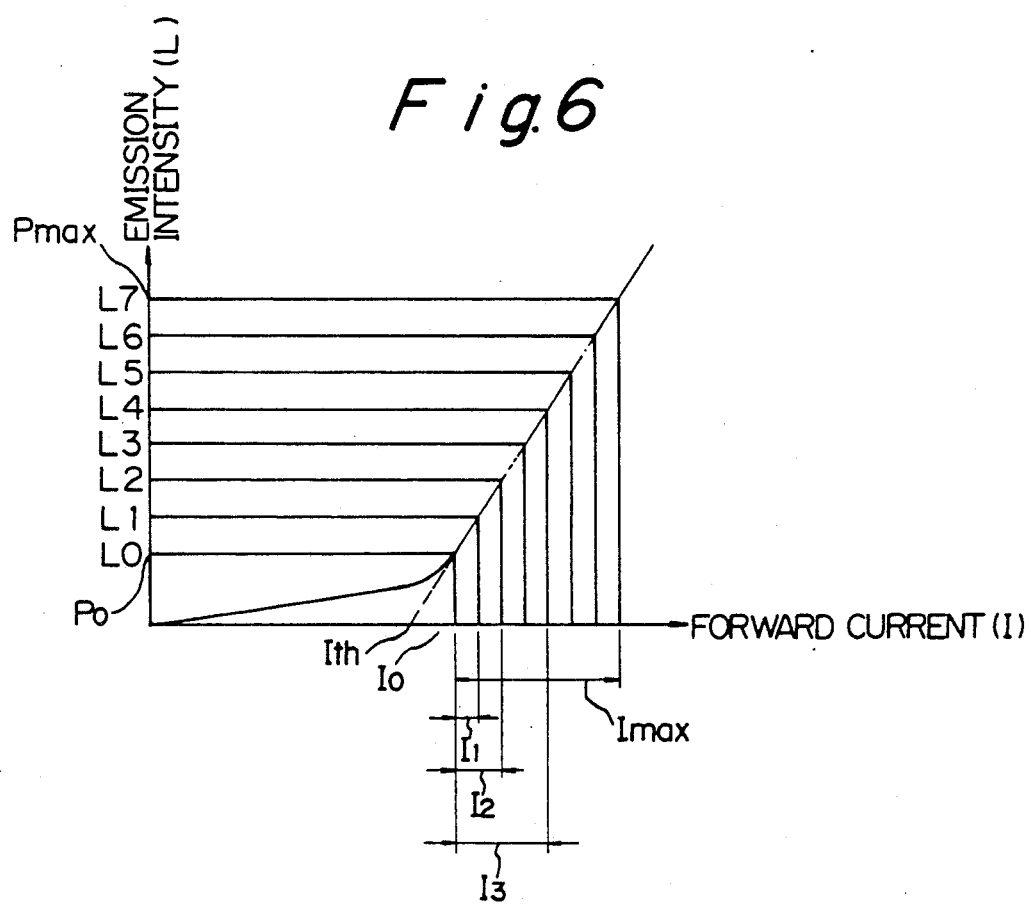
FIG. 6 is a graph showing a relationship between the forward current and the emission intensity of a semiconductor laser.

A drive control system for a semiconductor laser (LD) uses a relationship between the forward current I and the emission intensity L of LD, i.e., an I-L characteristic, as shown in FIG. 6. The I-L characteristic of LD is linear for the forward currents greater than the threshold current Ith and, in such a condition, the differential quantum efficiency n is regarded to be constant.

Figure 7:
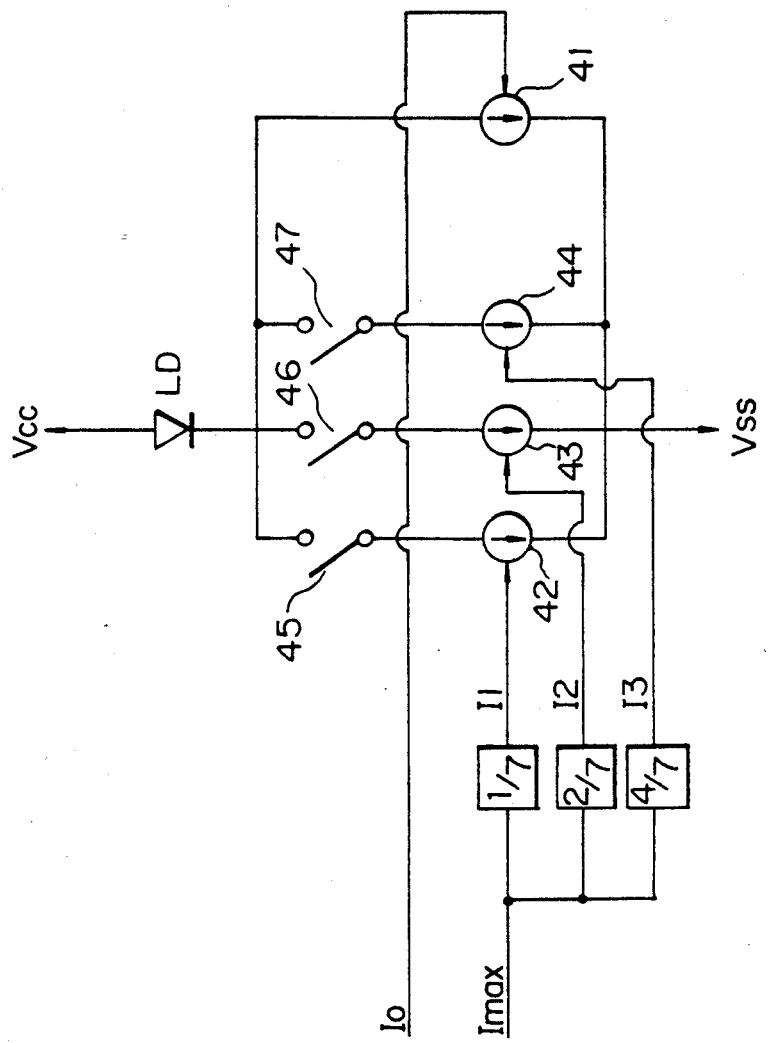
FIG. 7 is a block diagram showing a constant current source circuit schematically.

As shown in FIG. 7, the control system is such that a forward current is driven by the sum of currents generated by a plurality of constant current sources 41, 42, 43 and 44, and the resulting current is switched by switches 45, 46 and 47 in response to writing data. While the constant current source 41 feeds a bias current greater than the threshold current, the constant current sources 42, 43 and 44 which are weighted to have a relation of 1:2:4 with respect to current control the LD drive current to 3-bit eight levels. At this time, the current values are $I_1$, $I_2$ and $I_3$, while the minimum bias current when the switches 45, 46 and 47 are not driven is $I_0$. The emission intensities (quantities of light) associated with the currents $I_0$ to $I_3$ are shown in FIG. 6. It follows that with all the possible combinations of the currents $I_1$ to $I_3$ it is possible to provide eight different quantities of light $L_0$ to $L_7$ which are equal concerning the difference.

The emission intensities are set by the following procedure:

(1) setting a LD emission intensity range of $P_0$ to $P_{max}$ (where $P_0$ is nearly equal to zero);

(2) determining a LD forward current $I_0$ and thereby a LD minimum emission intensity $P_0$;

(3) determining $I_{max}$ on the basis of $I_0 + I_{max}$ and thereby a LD maximum emission intensity $P_{max}$; and (4) setting up $I1 = (1/7) \cdot I_{max}$, $I2$ $(2/7) \cdot I_{max}$, and $I3 = (4/7) \cdot I_{max}$.

Figure 8A:
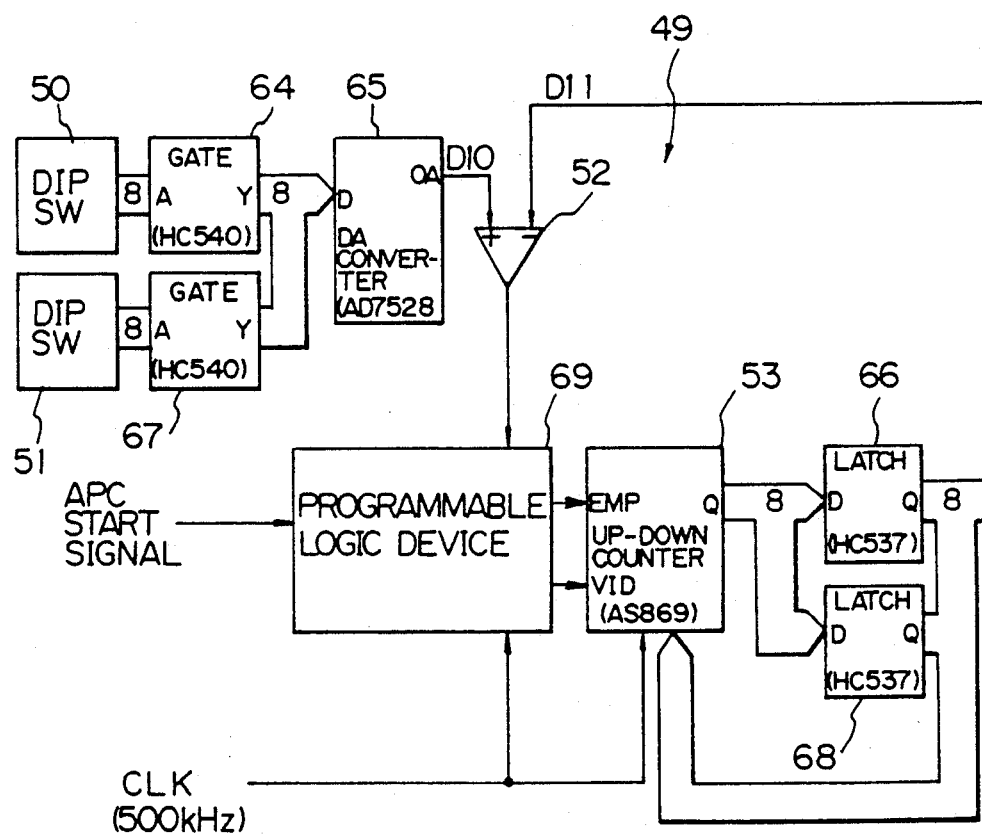
Figure 8B:
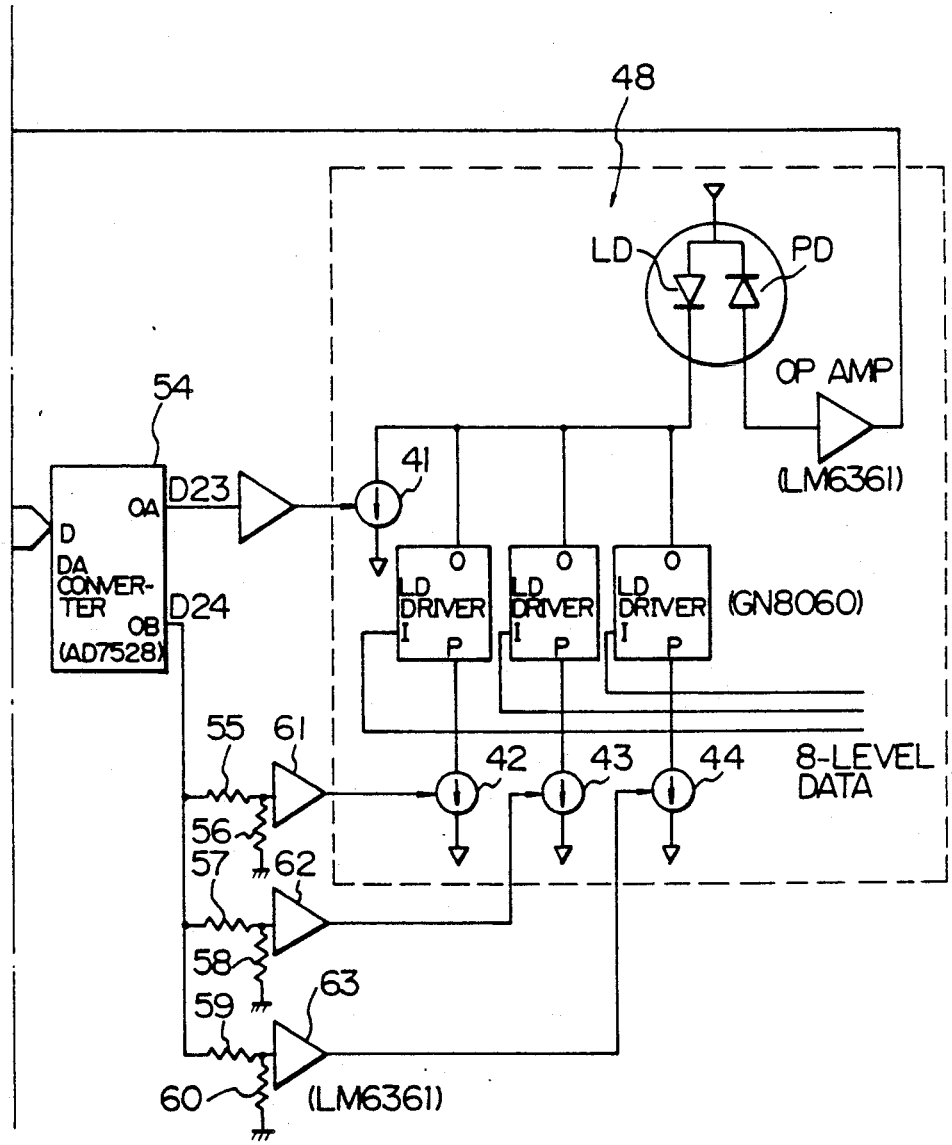

Referring to FIG. 8, a LD modulation control circuit will be described. As shown, the control circuit has an 8-level data modulation board 48 (indicated by a phantom line) and a LD control board 49. The 8-level modulation board 48 sums the currents from the current sources to determine the quantity of light of LD as stated previously. A photodiode (PD) built in the same LD package receives the resulted output light of the LD. The LD control board 49 performs emission value control (APC) for setting the levels of the constant current sources, and timing control. Specifically, an analog output $D_{10}$ set by a first or a second dip switch 50 or 51 and an output level $D_{11}$ of PD are compared by a comparator 52. An up-down counter 53 is incremented or decremented until $D_{10}$ and $D_{11}$ become equal. The output of the up-down counter 53 is applied to a digital-to-analog (DA) converter 54. The up-down counter 53 is repetitively incremented and decremented until the bias current $I_0$ and maximum current $I_7$ ($I_{max}$) of LD have been determined. Concerning the current levels for outputting 8-level outputs, the level of the analog output $D_{24}$ of the DA converter 54 is divided by resistors 55 to 60 to set up a relation of 1:2:4 in terms of voltage. Such voltages each drives a respective one of the constant current sources 42, 43 and 44 via on associated one of operational amplifiers (OP AMPs) 61, 62 and 63. While the current $I_0$ is controlled in the same manner by an analog output $D_{23}$, the level depends on the control range and resolution.

Figure 9:
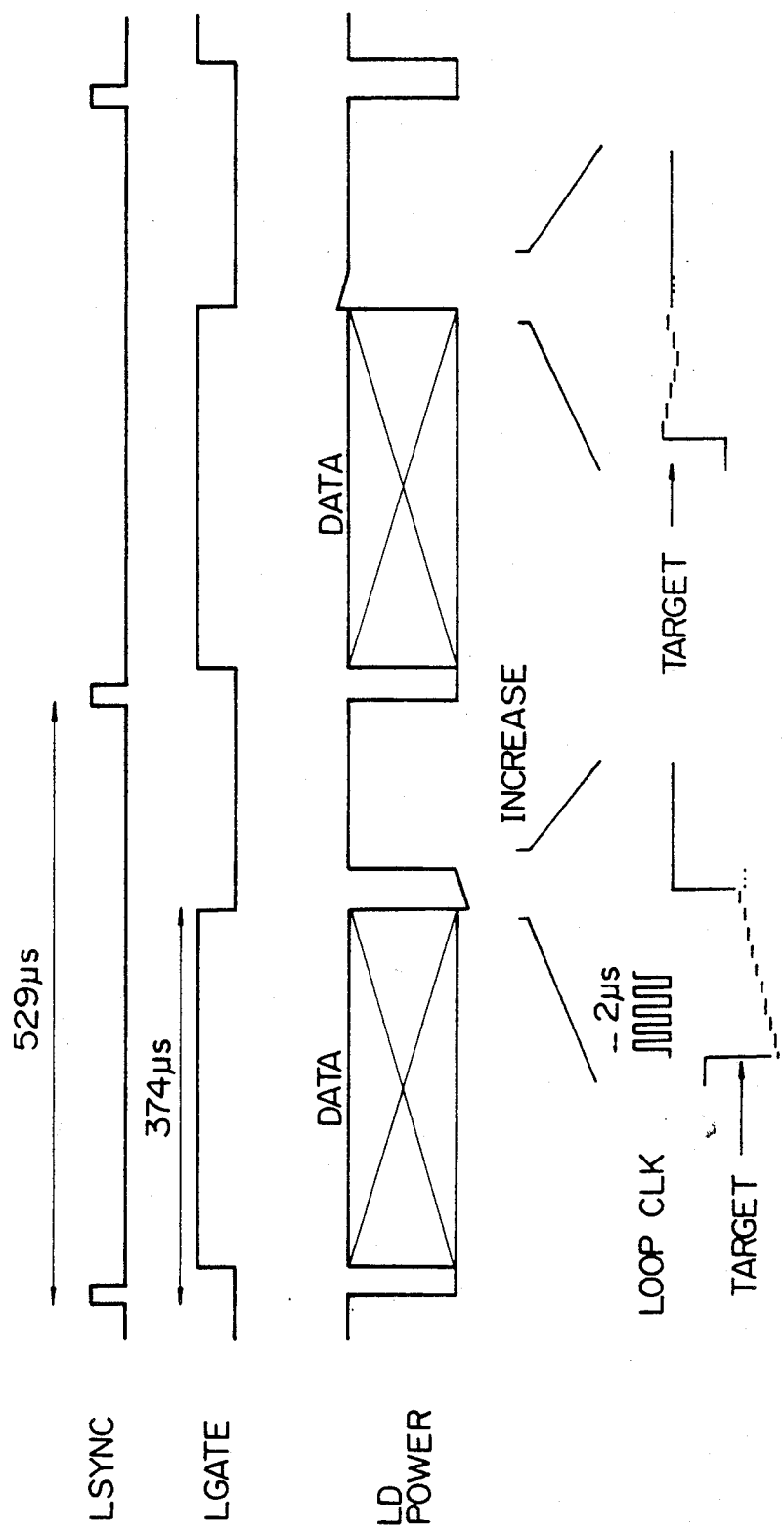
FIG. 9 is a timing chart representative of an emission value control (APC) procedure.

FIG. 9 is a timing chart representative of the emission value control (APC). As FIG. 9 indicates, the currents $I_0$ and $I_7$ associated with the minimum light output (level 0) and maximum light output (level 7), respectively, are set alternately from the instant when the output data of a main scanning line is ended to the instant when synchronization is detected. In response to an APC start signal, the level 0 is set first. The 8-bit data from the dip switch 50 is fed to a DA converter 65 via a gate 64 so as to set the light quantity of level 0. At the same time, counter data of level 0 set in the latch 66 previously is loaded in the up-down counter 53 (FFH at first) as an initial value. This is to speed up the operation for comparing the monitored quantity based on the counter output. All the density data are turned off to output a light quantity of level 0. This light quantity is compared with a light quantity monitored by PD, while the up-down counter 53 is incremented or decremented in response to the result of the comparison. The interval between the counter output and the comparison is about 1 microsecond, and the control loop clock is 500 kilohertz. In response to the next APC start (LGATE) signal, the level 7 is set in the same manner as the level 0. Specifically, the quantity of light is controlled to the target value associated with the output data of the dip switch 51. The level 7 is implemented by an exclusive gate 67 and an exclusive latch 68 and is set with all the density data being turned on. When the monitored light quantity exceeds the set value, whether the level be 0 or 7, the counter 53 is stopped to eliminate an error ascribable to the setting direction. All the density data are turned on (level 7 output) at the end of the setting operation or on the lapse of 100 microseconds as counted from the APC start signal for the purpose of detecting synchronization.

For the above-described APC timing control, use is made of several PLDs (Programmable Logic Devices) 69 for generating trigger signals and other similar signals meant for the other ICs.

The procedure described above realizes APC capable of setting 8-bit 256 consecutive steps of light quantity. Such quantities of light are alternately set on a main scanning line basis to thereby prevent the analog output of the quantity of light from fluctuating.

The illustrative embodiment implements a 1-dot 15-tone laser beam writing apparatus by combining 2-level (2-step) PWM and 8-level (8-step) analog modulation. Analog modulation is effected by using the previously stated modulation system, while PWM is effected by dividing a 1-dot (1-pixel) write clock into a former half and a latter half for time division control.

A method of outputting fifteen levels will be described.

Figure 10:
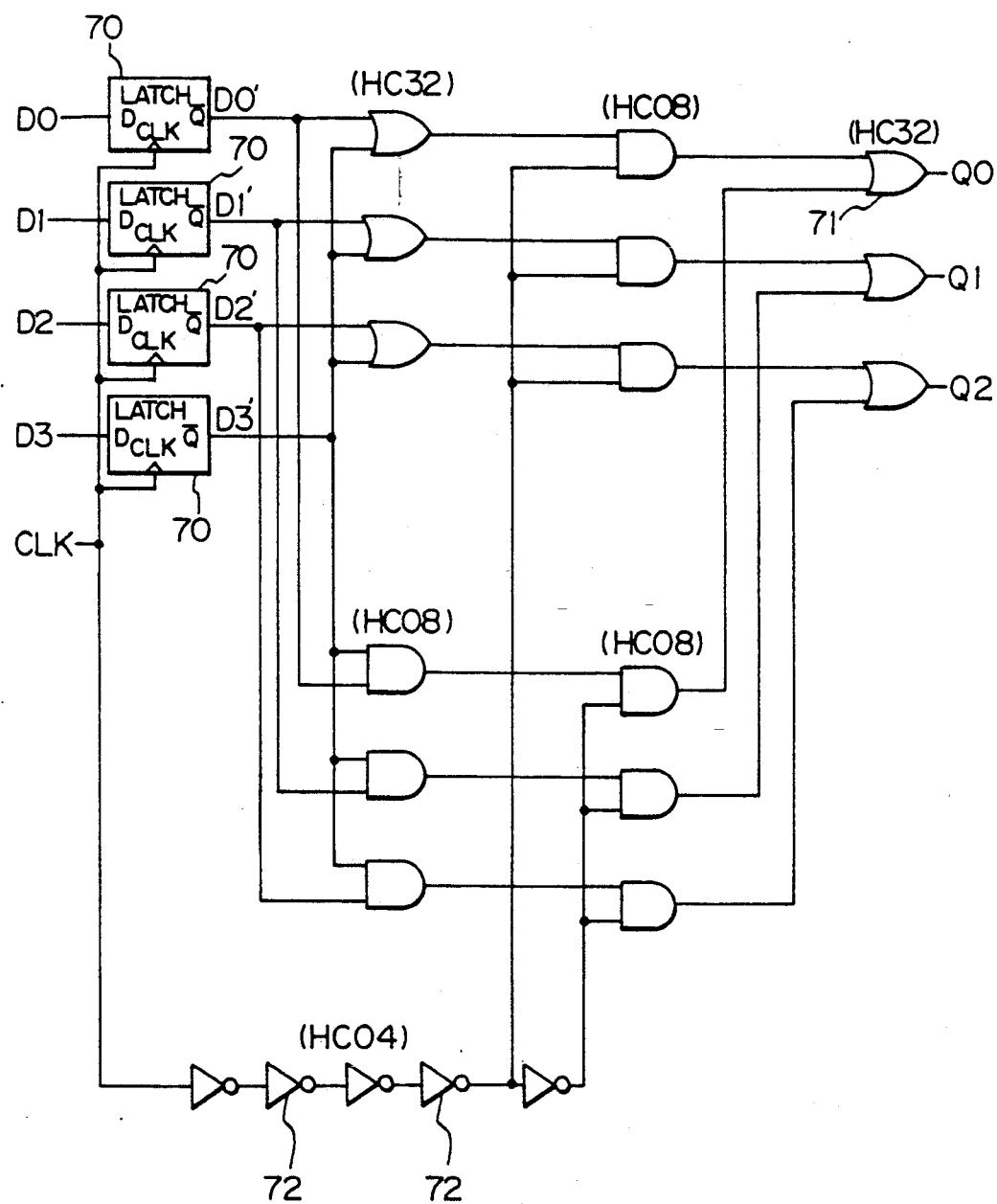
FIG. 10 is a block diagram showing an output data converting circuit schematically.
Figure 11:
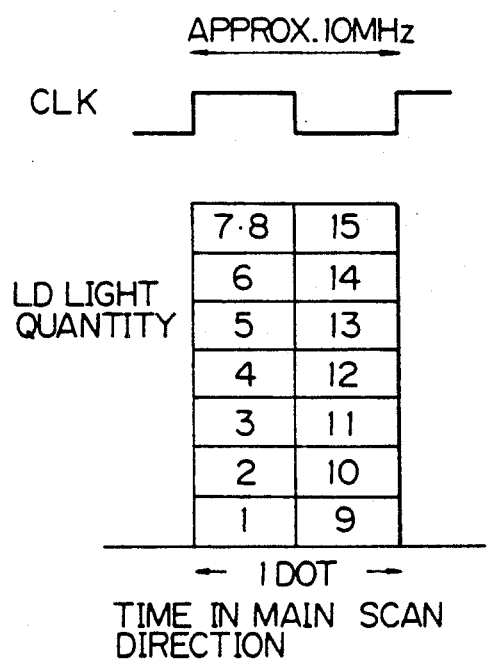
FIG. 11 is a timing chart demonstrating the operation of the circuit shown in FIG. 10.
Figure 12:
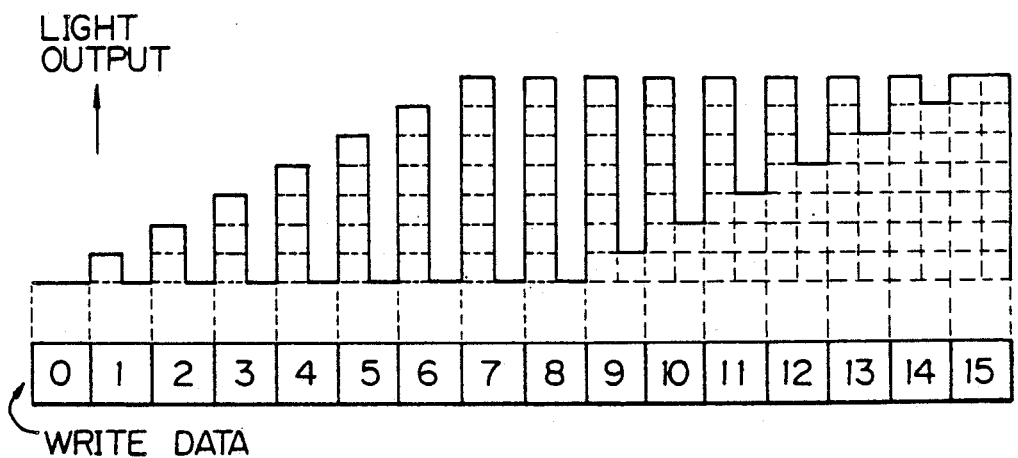
FIG. 12 shows waveforms relating to the circuit of FIG. 10.

Referring to FIG. 10, a 1-dot 15-level output data conversion circuit is shown which uses the combination of 8-level analog modulation and 2-level PWM. FIG. 11 is a timing chart demonstrating the operation of such a circuit. The density data outputted by the CCD image sensor 17, FIG. 3, is converted into digital data and then applied to the circuit of FIG. 10 as a 4-bit (16-level) digital signal $D_0$ to $D_3$. A pixel clock CLK is also fed to the circuit of FIG. 10 in synchronism with the data. The input density data $D_0$ to $D_3$ are latched by latches 70 in synchronism with the pixel clock CLK. The latched data are produced via inverting outputs $\overline{Q}$ of the latches 70 in order to produce complements of the input data which have been inverted with respect to black/white. Subsequently, the data is processed by being divided into a former half and a latter half at the half-wave portion of the clock CLK. When the 16-level input data is greater than "8", i.e., when the output $D'_3$ is in a high level, the former half-wave data is the maximum output (level 7) and the part exceeding "8" is analog-modulated during the latter half-wave period. When the data is smaller than "7", the latter half-wave period remains OFF (level 0) to produce the minimum output and analog modulation is effected during the former half-wave period in association with the data. OR gates 71 located at the last stage of the circuitry serve to combine the data of the former and latter halves of the pixel clock. The series connection of a plurality of NOT gates 72 functions to compensate for the delay particular to the propagation of data. FIG. 12 shows output waveforms associated with the sixteen levels, i.e., levels 0 to 15 of the 1-dot (1-pixel) 15-level output derived from the 4-bit 16-level input signal. In the illustrative embodiment, the output waveforms associated with the levels 7 and 8 are identical and are the same with respect to the writing density. This problem will be readily solved if the data is reduced by 1 when the data is smaller than "7" or if the data is increased by 1 when the data is greater than "8".

Figure 13:
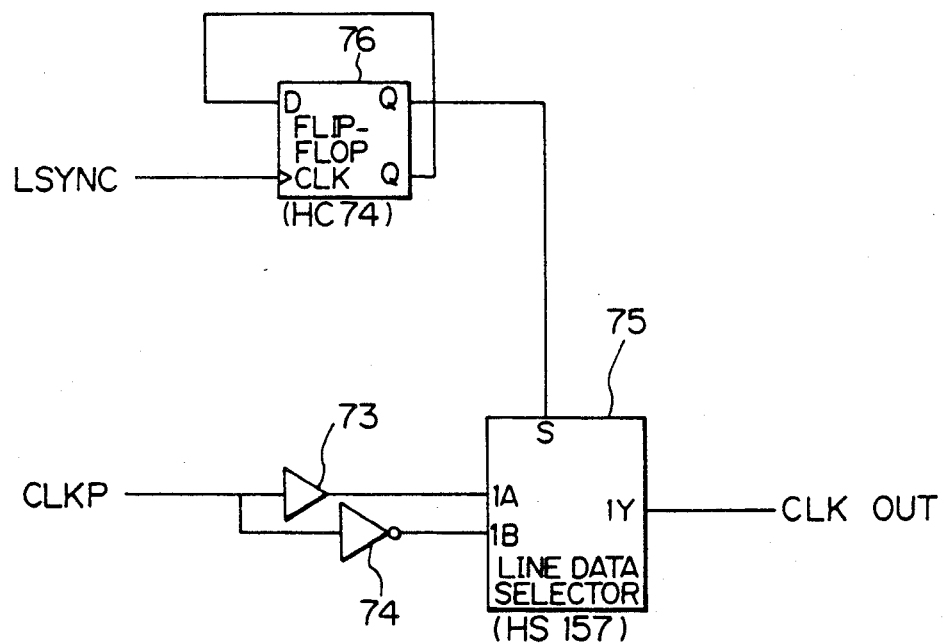
FIG. 13 is a block diagram showing a phase shifting circuit schematically.
Figures 14A, 14B:
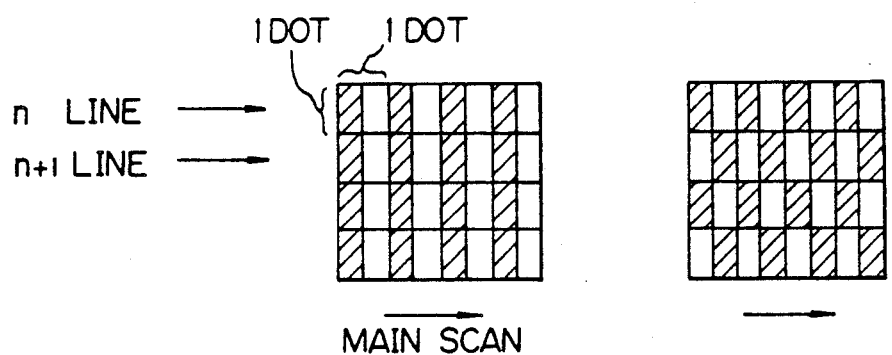
FIGS. 14A to 14F are views useful for understanding the operation of the circuit shown in FIG. 13.

Referring to FIG. 13, a circuit for shifting the phase in relation to the previously stated PWM is shown. In the illustrative embodiment, 2-level PWM is effected within one dot so that, when a halftone is outputted, the image is apt to have periodicity due to the concentration of dots, as shown in FIG. 14A. In light of this, the circuit of FIG. 13 shifts the phase by a half wave, i.e., by 180 degrees on a main scanning line basis, as shown in FIG. 14B. In FIG. 13, a write pixel clock CLKP is applied to a buffer 73 and an inverter 74 to produce two clocks which are different in phase by 180 degrees. The two clocks are fed to a line data selector 75. On the other hand, the synchronization detection signal LSYNC derived from the rotation of the motor 19B is fed to a D flip-flop 76 to invert the Q output of the latter at every positive-going edge of the signal LSYNC. More specifically, the S input of the line data elector 75 is inverted every main scanning line with the result that, as shown in FIG. 14F, pixel clocks which are deviated in phase by 180 degrees appear. Since the beginning of writing in the main scanning direction is synchronized in response to the synchronizing signal LGATE by a reference clock whose frequency is several times higher than the frequency of the pixel clock CLKP, the deviation regarding the writing of a dot in the subscanning direction is limited to less than a fraction of a dot. Hence, every time one main scanning line of data is written, a clock CLK OUT opposite in phase to the previous one appears at substantially the same position in the main scanning direction.

The writing operation of the shifting circuit shown in FIG. 13 will be described.

A specific writing operation of the phase inverting circuit shown in FIG. 13 is shown in FIGS. 14A to 14F and FIGS. 15A to 15C. For the illustration, the data to be written (density data) is assumed to represent a solid halftone portion of level 7.

Figures 14C, 14D:
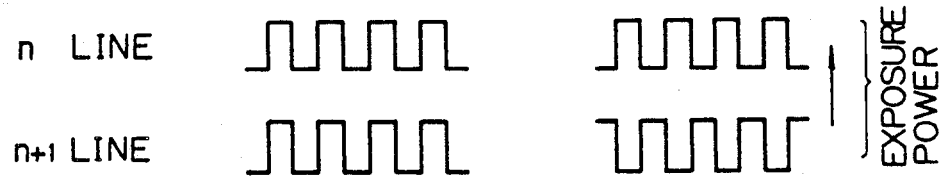
Figures 14E, 14F:
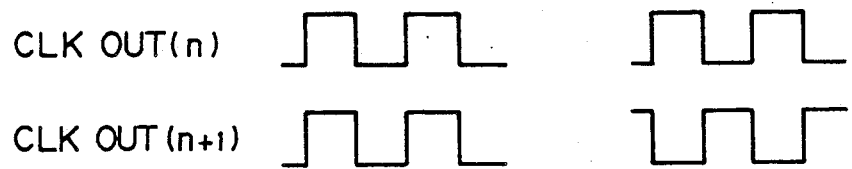

When the phase inversion described with reference to FIG. 13 is not used, light outputs or exposing powers of level 7 shown in FIG. 14C are produced in response to CLK OUT (n) of the n-th main scanning line and CLK OUT (n+1) of the (n+1)-th main scanning line. On the other hand, when the phase inversion is effected, exposure occurs alternately on the n-th and (n+1)-th lines at the same positions as viewed in the subscanning direction, as shown in FIG. 14D. Output images resulting from the exposure shown in FIGS. 14C and 14D are shown in FIGS. 14A and 14B, respectively. In FIG. 14A, black portions and white portions each occupying one half of a dot area appear continuously in the subscanning direction, the black portions forming false lines. On the other hand, in FIG. 14B, the black portions appear in a scattered or zig-zag configuration, rendering halftones which appears more natural. Concerning the amount of data contained in one dot, the configurations shown in FIGS. 14A and 14B are the same and are free from the omission of image data particular to the conventional image processing (e.g. dither method).

FIGS. 15A to 15C show an alternative approach which uses a clock CLK×2 whose frequency is double ($2^1$) the frequency of the pixel clock and effects pulse width modulation on a ½-dot pulse width basis. This alternative approach, like the approach of FIGS. 14A and 14B, applies analog modulation to the duration of a pulse width. Specifically, in FIG. 15A, the phase of CLK1 is sequentially shifted by 180 degrees line by line in the main scanning direction while, in FIG. 15B, it is sequentially shifted by 360 degrees, 540 degrees, 360 degrees and 180 degrees. Each dot begins to increase the pulse width for rendering a tone at the pulse point represented by a dashed area and sequentially increases it in the main scanning direction. On the N+3 line, the black portion sequentially grows in the order of phases 1, 2 and 3 from a phase 4.

As stated above, in the illustrative embodiment, the dot forming pattern may be shifted periodically in order to further enhance high-quality image reproduction. The freedom of scattering of dots sequentially increases on the basis of the number of modulations P and in the combinations of P! formation patterns.

While the illustrative embodiment has concentrated on a laser printer, the present invention is, of course, applicable to any other kind of image forming equipment.

In summary, it will be seen that the present invention provides a multi-tone laser beam writing apparatus which with a simple construction is capable of rendering multiple tones accurately by a single dot. Also, the apparatus renders halftones evenly by preventing dot densities from concentrating.

Various modifications will become possible for those skilled in the art after receiving the teachings of the present disclosure without departing from the scope thereof.

What is claimed is:

1. A multi-tone laser beam writing apparatus comprising:
   pixel clock generating means for generating pixel clocks by dividing a plurality of reference clocks; and
   analog modulating means for analog-modulating a quantity of a laser beam in response to said pixel clocks generated by said pixel clock generating means
   wherein said pixel clock generating means generates said pixel clocks on the basis of upper bit data of image density data while said analog modulating means analog-modulates the quantity of the laser beam on the basis of lower bit data of said image density data.

2. A multi-tone laser beam writing apparatus comprising:
   pixel clock generating means for generating pixel clocks by dividing a plurality of reference clocks;
   modulating means for modulating a quantity of a laser beam in response to said pixel clocks generated by said pixel clock generating means; and
   shifting means for shifting a phase of output signals of said pixel clock generating means from one main scanning line to another with respect to laser beam writing.

3. An apparatus as claimed in claim 2, wherein said modulating means comprises analog modulating means.

4. An apparatus as claimed in claim 3, wherein said pixel clock generating means generates said pixel clocks on the basis of upper bit data of image density data while said analog modulating means analog-modulates the quantity of the laser beam on the basis of lower bit data of said image density data.

5. A multi-tone laser beam writing apparatus comprising:

pixel clock generating means for generating pixel clocks by dividing a plurality of reference clocks; and analog modulating means for analog-modulating a quantity of a laser beam in response to said pixel clocks generated by said pixel clock generating means wherein said pixel clock generating means generates said pixel clocks on the basis of upper data of image density data while said analog modulating means analog-modulates the quantity of the laser beam on the basis of lower data of said image density data.

* * * * *